US007020283B1

(12) United States Patent
Wada et al.

(10) Patent No.: US 7,020,283 B1
(45) Date of Patent: Mar. 28, 2006

(54) RANDOM NUMBER GENERATION APPARATUS AND RANDOM NUMBER GENERATION METHOD

(75) Inventors: Takuya Wada, Kanagawa (JP); Yoshihiro Tsukamura, Kanagawa (JP)

(73) Assignee: Sony Corporation, (JP)

( * ) Notice: Subject to any disclaimer, the term of this patent is extended or adjusted under 35 U.S.C. 154(b) by 1076 days.

(21) Appl. No.: 09/634,841

(22) Filed: Aug. 8, 2000

(30) Foreign Application Priority Data

Aug. 10, 1999 (JP) ............................... P11-226555

(51) Int. Cl.
*H04L 9/00* (2006.01)
*G06F 7/58* (2006.01)

(52) U.S. Cl. ........................ 380/46; 708/255; 713/186; 382/127

(58) Field of Classification Search .......... 708/250–56; 380/44–46; 713/186; 382/115, 124–127; 340/5.82–5.83
See application file for complete search history.

(56) References Cited

U.S. PATENT DOCUMENTS 4,225,850 A * 9/1980 Chang et al. ............... 382/124
5,187,748 A * 2/1993 Lee ........................... 382/127
5,541,994 A * 7/1996 Tomko et al. ................ 380/30
5,774,549 A * 6/1998 Nielsen ...................... 380/200
6,215,874 B1 * 4/2001 Borza et al. ................. 380/46
6,259,801 B1 * 7/2001 Wakasu ...................... 382/100
2002/0124176 A1 * 9/2002 Epstein ....................... 713/186

OTHER PUBLICATIONS

Schneier, B., Applied Cryptography, 1996, John Wiley & Sons, Inc., 2nd Edition, pp. 466-474, especially pp. 466-467.*
Schneier, B., Applied Cryptography, 1996, John Wiley & Sons, Inc., 2nd Edition, pp. 466-474, especially pp. 466-467.*

* cited by examiner

*Primary Examiner*—Gilberto Barrón, Jr.
*Assistant Examiner*—Minh Dinh
(74) *Attorney, Agent, or Firm*—Rader, Fishman & Grauer PLLC; Ronald P. Kananen

(57) ABSTRACT

The random number generating apparatus includes as a random number generation block: an A/D converter for converting a pick-up signal output from a pick-up block, into a digital image; a memory where the digital image is stored as pixel values; and a random number generator for extracting a digital data from pixel values of a plurality of pixels within the digital image of the pick-up signal output when no subject is present from the pick-up block stored in the memory and generating a random number from the digital data correlated to the plurality of pixels. Thus, it is possible to generate a random number having a long periodicity.

27 Claims, 4 Drawing Sheets

RANDOM NUMBER GENERATION APPARATUS AND RANDOM NUMBER GENERATION METHOD

BACKGROUND OF THE INVENTION

1. Field of the Invention

The present invention relates to a random number generation apparatus and a random number generation method for generating a random number sequence.

2. Description of the Related Arts

As a conventional random number generation method on a computer, there can be exemplified the linear congruence method or multiplication congruence method and method using a shift register or DES (data encryption standard) which is one of the data encryption standards.

A random number sequence generated by the aforementioned methods inevitably has a regularity and its periodicity is a short. Accordingly, it is not proper to use such a random number sequence for generating an encryption key and a seed for generating an encryption key or for encryption of a message.

SUMMARY OF THE INVENTION

It is therefore an object of the present invention to provide a random number generating apparatus and a random number generating method for generating a random number sequence having a long periodicity.

The random number generation apparatus according to the present invention includes: pick-up means, digital image conversion means for converting into a digital image a pick-up signal output from the pick-up means, storage means for storing the digital image as pixel values, and random number generating means for extracting a digital data from pixel values of a plurality of pixels in the digital image of the pick-up signal output when no subject is present from the pick-up means stored in the storage means and generating a random number from the digital data correlated to the plurality of pixels.

In the random number generating apparatus having the aforementioned configuration, a pick-up signal output from the pick-up means is converted into a digital image by the digital image conversion means and pixel values of the digital image are stored in the storage means. The random number generating apparatus extracts a digital data from pixel values of a plurality of pixels within the digital image of the pick-up signal output when no subject is present from the pick-up means stored in the storage means, so that the random number generation means generates a random number from the digital data correlated to the plurality of pixels.

Since there is no regularity in the pixel values of the respective pixels of the digital image obtained when no subject is present, the random number generated by the random number generating apparatus has a long periodicity.

Moreover, in the random number generating apparatus according to the present invention, in order to solve the aforementioned problem, a pick-up signal output from the pick-up means when no subject is present is converted into a digital image and a digital data is extracted from pixel values of a plurality of pixels within the digital image, so that a random number is generated from the digital data correlated to the plurality of pixels.

Since there is no regularity in the pixel values of the respective pixels of the digital image obtained when no subject is present, the random number generated by the random number generating method has a long periodicity.

DETAILED DESCRIPTION OF PREFERRED EMBODIMENTS

Figure 1:
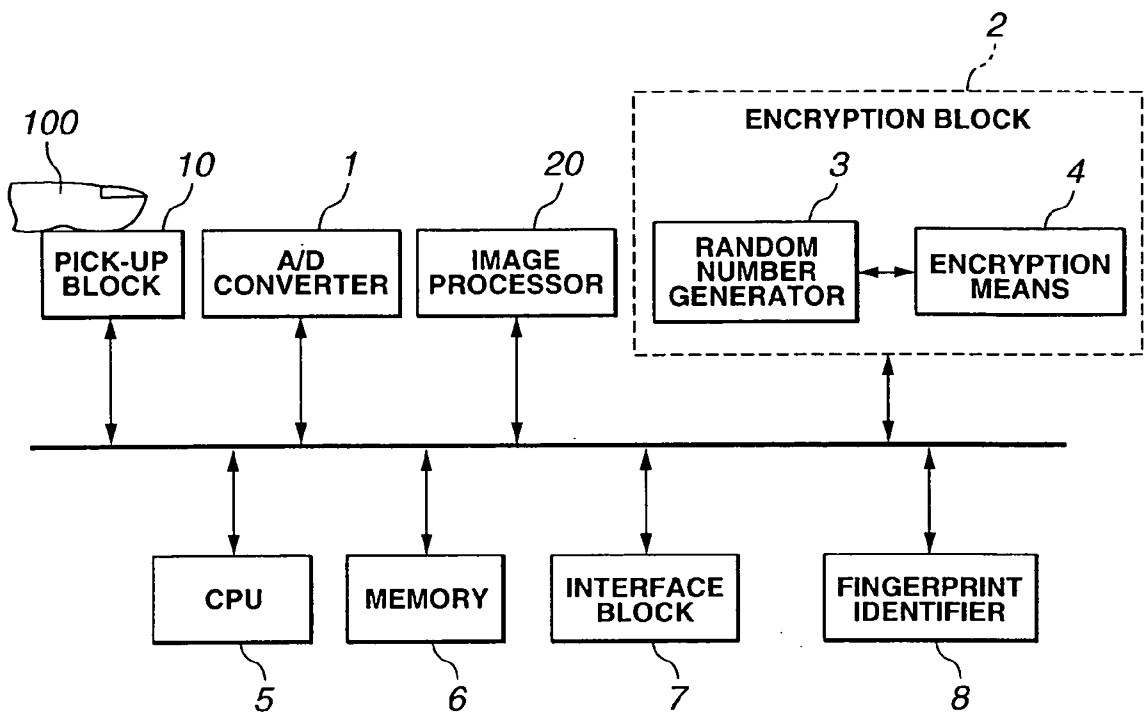
FIG. 1 is a block diagram showing a fingerprint identification apparatus including a random number generation apparatus according to the present invention as an encryption block.

Hereinafter, a detailed explanation will be given on an embodiment of the present invention with reference to the attached drawings. As shown in FIG. 1, this embodiment is a fingerprint identification apparatus including an A/D converter 1, an encryption block 2 having a random number generator 3 and encryption means 4, a CPU 5, a memory 6, an interface block 7, and a fingerprint identifier 8. Here, the A/D converter 1, the random number generator 3, and the memory 6 constitute an example of configuration of a random number generation apparatus according to the present invention.

The fingerprint identification apparatus constitutes a personal identification apparatus for identifying a person according to a fingerprint image fetched by a pick-up block 10. In this fingerprint identification apparatus, when a desired person is identified according to a fingerprint image as a living body information, an encryption key is generated according to a random number sequence generated in the random number generator 3 and a plain text is encrypted.

Figure 2:
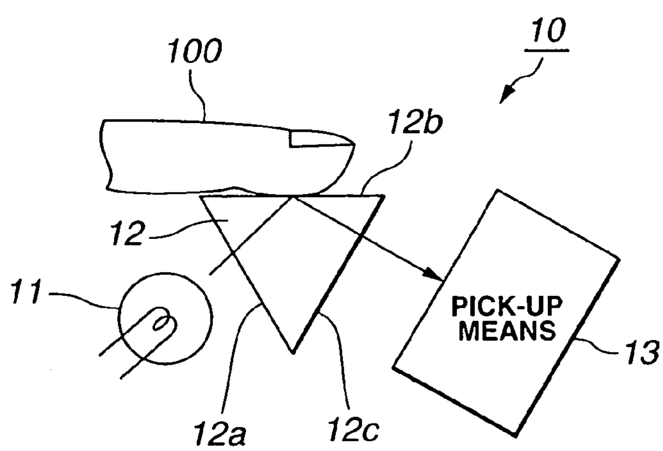
FIG. 2 is a block diagram showing a configuration of a pick-up block of the aforementioned fingerprint identification apparatus.

The pick-up block 10 is constructed so as to pick-up a fingerprint as a living body information. More specifically, as shown in FIG. 2, the pick-up block 10 includes a light source 11, a prism 12, and pick-up means 13.

The prism 12 has a triangular cross section. The light from the light source 11 is incident from the first face 12*a*, reflected from a subject placed on the second face 12*b*, and goes out from the third face 12*c*. Here, the subject is a fingerprint of a finger 100 for identifying an individual person. The pick-up means 13 is arranged at a position so as to detect the light emitted from the third face 12*c*. The pick-up means 13 is, for example, a CCD (Charge-Coupled Device) camera.

In the pick-up block 10 having the aforementioned configuration, when the finger 100 is placed on the second face 12*b* of the prism 12, the light emitted from the light source 11 comes into the prism through the first face 12*a* and is reflected irregularly by the convex portion of the fingerprint of the finger 100 on the second face 12*b* or reflected totally by the concave portion. These reflected lights go out from the third face 12*c* and form an image in the pick-up means 13. Thus, in the pick-up means 13, the convex portion of the finger 100 is picked up as a dark portion and the concave portion is picked up as a bright portion. The pick-up means 13 outputs a pick-up signal as a pick-up information.

The pick-up signal output from the pick-up block 10 is sampled at an appropriate time interval and converted by the A/D converter 1 into a digital image of a size, for example, 256×128. In this embodiment, the A/D converter 1 performs an 8-bit conversion. Thus, pixel values of the pixels constituting an image are digital data expressed by 256 gradations from 0 to 255. The digital image obtained in this A/D converter 1 is stored in the memory 6. Hereinafter, a digital image whose pixel value is expressed by multiple bits such as 8 bits will be referred to as a gray scale image.

Figure 3:
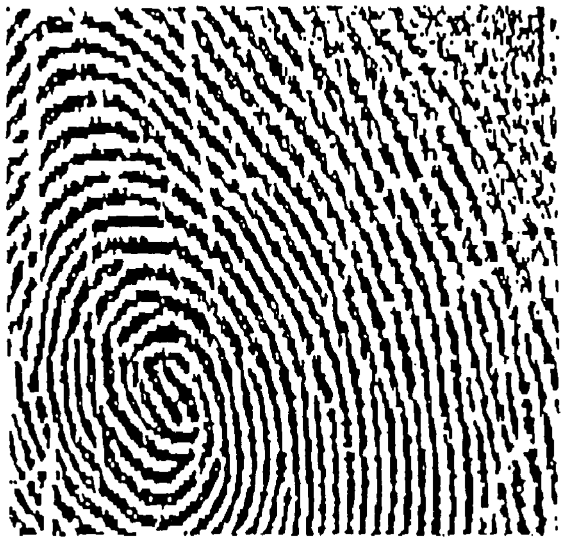
FIG. 3 shows a binary image of a fingerprint obtained in the aforementioned fingerprint identification apparatus.

According to the gray scale image, the image processor 20 generates a binary image. For example, the image processor 20 fetches the gray scale image at an appropriate timing and using an appropriate binarization method, generates a binary image in which pixel value of each 8-bit pixel has been converted into '0' or '1'. The binarization method may be a comparison between an average of pixel values of the entire image and pixel values of the respective pixels or a moving average method, i.e., comparison between a pixel value of a pixel to be considered and an average of pixel values of a plurality of pixels located in a predetermined range from the considered pixel. For example, the fingerprint image picked up in the pick-up block 10 is made into a binary image as shown in FIG. 3 by the moving average method. In FIG. 3, the black portions represent convex portions of the fingerprint and the white portions represent concave portions of the fingerprint.

The binary image thus generated is subjected to a pre-processing such as a thinning and then processes such as registration and identification are performed. It should be noted that the binary image generation from the gray scale image by the aforementioned moving average method will be detailed later.

The fingerprint identifier 8 identifies the binary image. For example, the fingerprint identifier 8 identifies a registered image information on the fingerprint information which has been fetched in advance with the binary image of the fingerprint picked up by the pick-up block 10. According to the identification result in the fingerprint identifier 8, the fingerprint identification apparatus identifies a desired individual.

It should be noted that the CPU 5 is control means for controlling respective components constituting the fingerprint identification apparatus.

As has been described above, the fingerprint identification apparatus identifies a fingerprint from a digital image picked up by the pick-up block 10 to identify a desired individual. When an individual is identified by such a fingerprint identification process, the fingerprint identification apparatus encrypts a plain text using a private key. This encryption using a private key is performed according to a prime number obtained according to a random number sequence generated by the random number generator 2.

Next, explanation will be given on the process how the encryption block 2 causes the random number generator 3 to generate a random number sequence and the encryption means 4 to perform encryption using an encryption key according to the random number sequence. It should be noted that although the random number generator 3 is constructed to generate a random number sequence from the aforementioned gray scale image or the binary image, explanation will be given on a case of generating a random number sequence according to a gray scale image.

Figure 4:
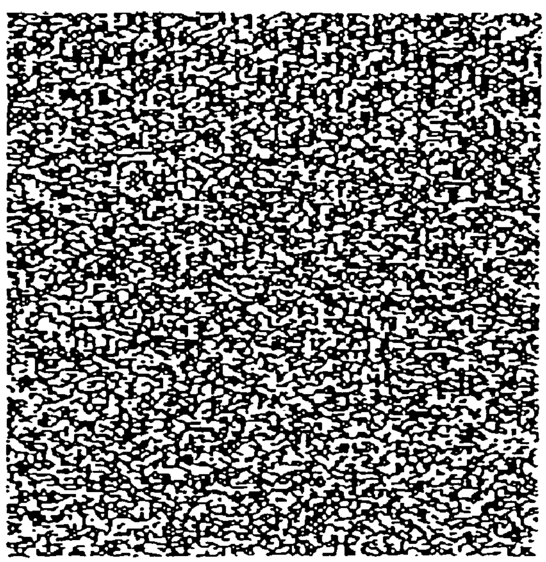
FIG. 4 shows an image made up by the least significant one bit of the gray scale image of the fingerprint obtained in the aforementioned fingerprint identification apparatus.

In the pick-up block 10, when an image is taken in without placing a finger on the prism 12, a pick-up signal output from the pick-up means 13 is overlapped with a noise. As a result, the least significant bit of the gray scale image obtained by digital conversion in the A/D converter 1 shows a value of irregular '0' or '1'. For example; similar irregular values are shown for a binary image. Accordingly, in the gray scale image, it is possible to obtain a random number sequence consisting of '0' and '1' and having an arbitrary length from a bit sequence of an arbitrary length starting at an appropriate position as a start address. For example, in the gray scale image, when it is assumed that the least significant bit '0' represents black and the least significant bit '1' represents white, it is possible to obtain a binary image as shown in FIG. 4. As shown in this FIG. 4, the least significant bits of the gray scale image have no regularity.

According to the random number sequence obtained by the random number generator 3, the encryption block 2 generates an encryption key or seed as an origin of the encryption key and performs encryption in the encryption means 4.

In general, in order to generate an encryption key, there is a case to use a random number sequence directly as a key or to create a key according to the random number sequence. The former, for example, is the DES (data encryption standard) and the latter, for example, is the RSA encryption method utilizing the difficulty of factorization of a very large number into prime factors. It should be noted that the RSA encryption method is an encryption method invented by Rivest, Shamit, and Adleman of the MIT. In the present embodiment, the random number generator 3 employs the RSA encryption method to create an encryption key. Explanation will be given on this case.

Moreover, the RSA encryption method creates a 384-bit, 512-bit, or 1024-bit key for encryption. Here, explanation will be given on a case using the 512-bit key. The outline of the RSA encryption method is as follows.

In the RSA encryption method, from two prime numbers p and q and one of the public keys E (public exponent), using Equations (1) and (2), the other public key, i.e., the public key N (modulus) and a private key D (private exponent) will be obtained.

$$N=p\times q \tag{1}$$

$$D=E^{-1} mod\{(p-1)\times(q-1)\} \tag{2}$$

Here, the public key E and the multiple of (p−1) and (q−1) are mutually prime. If a message (plain text) is M and an encrypted message is C, then relations expressed by Equations (3) and (4) are satisfied.

$$C=M^{E} modN \tag{3}$$

$$M=C^{D} modN \tag{4}$$

The public key N is a very large 512-bit number and it is very difficult to factorize it into prime factors and accordingly, the addressee cannot obtain the previous message M from the encrypted message C unless the addressee knows the private key D. Moreover, in order to add a digital signature to the message C when sent to the addressee, the addresser encrypts the message C having his/her signature using his/her private key D according to Equation (4) when sending the message M. The addressee decodes the message using the public key E and the public key N of the addresser according to Equation (3) and confirms that the signature of the addresser is added.

This is the outline of the RSA encryption method. In the encryption means 4 employing the RSA encryption method, a 512-bit key is required. A random number sequence generated in the random number generator 3 is used for creating such a 512-bit key. Such a 512-bit key can be generated by generation of a random number sequence as follows.

Since the key length is 512 bits, firstly, the random number generator 3 generates two 256-bit random numbers. These two random numbers serve as seeds, i.e., initial values for finding two prime numbers.

As has been described above, when generating a random number, the fingerprint identification apparatus takes in an image without placing a finger 100 on the prism 12 and obtains a gray scale image as a digital image formed by the A/D converter 1. The fingerprint identification apparatus stores the gray scale image on memory 6 as having size of 256 pixels in the horizontal direction and 128 pixels in the vertical direction in which each pixel value is expressed by 8 bits. It should be noted that simultaneously with such a gray scale image, the fingerprint identification apparatus fetches a binary image from this gray scale image by the image processor 20. The fingerprint identification apparatus stores the binary image on memory 6 as having a size of 256 pixels in the horizontal direction and 128 pixels in the vertical direction in which each pixel is expressed by 1 bit.

As has been described above, the least significant bits of the pixel value of pixels in the gray scale image have no regularity. Accordingly, by extracting the least significant bits of the pixel values for a plurality of pixels, it is possible to generate a random number having a long periodicity. The random number generator 3 generates a random number by extracting the least significant bits of pixel values of a plurality of pixels constituting a predetermined area starting at a pixel located at a start address. Here, the start address is an information indicating a position of a pixel where the least significant bit extraction is started.

More specifically, pixels are scanned in the horizontal direction starting at the start address so as to extract the least significant bit value of the pixels, i.e., '0' or '1'. Assuming i for the horizontal direction address and j for the vertical direction address, an arbitrary point on the gray scale image is defined as g (i, j).

For example, the start address is defined as (128, 0) and the 512 pixels are scanned from the pixel g (128, 0) to the pixel g (129, 255) and the least significant bit values are extracted to generate two 256-bit random numbers.

Moreover, it is also possible to generate a random number by defining a start address at an appropriate position instead of a predetermined position. In this case, values from 0 to 127 are expressed by 7 bits. Accordingly, by defining the start address by the horizontal address i and the vertical address j specified by the 8 bits of pixel values of the pixel g (0, 0) and the least significant 7 bits of the pixel values of the pixel g (0, 1), values of the least significant bits of the pixel values of pixels are extracted to generate a random number. For example, when the value expressed by an 8-bit pixel value of the pixel g (0, 0) is 100 and the value expressed by the least significant 7 bits of the pixel value of the pixel g (0, 1) is 23, the least significant bit of the pixel value of the pixel g (100, 23) is extracted to generate a random number.

Furthermore, when there is a correlation between two adjacent pixels in the horizontal direction, a particular pattern (random number) is easily generated. Taking this into consideration, the least significant bit of the pixel value can be extracted. For example, scan is performed in the vertical direction and the least significant bit of the pixel value is extracted. Moreover, it is possible to perform an exclusive OR operation between two adjacent pixels in the vertical direction to extract a 1-bit data. Alternatively, it is possible to perform an image take-in twice and perform an exclusive OR operation between two images so as to extract a 1-bit data.

Figure 5:
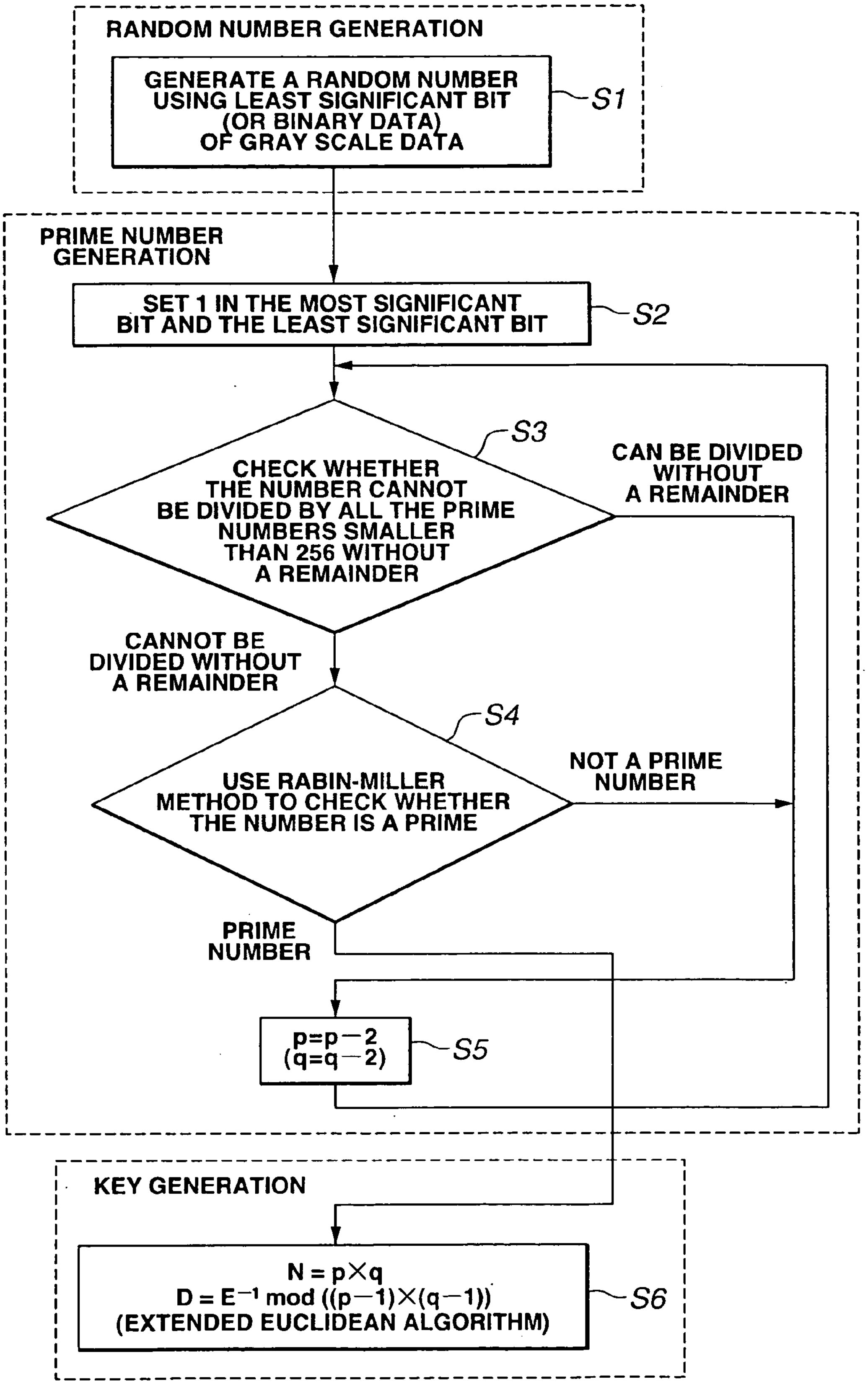
FIG. 5 is a flowchart showing a random number generation step, a prime number generation step, and a key generation step.

As has been described above, the random number generator 3 generates a complete random number having a long periodicity by extracting the least significant-bit of pixel values of pixels. The encryption means 4 generates two prime numbers p and q from the two random numbers generated by the random number generator 3. As shown in FIG. 5, the encryption means 4 generates an encryption key through a prime number generation process and a key generation process.

Firstly, as shown in FIG. 5, according to a random number generated by the least significant bits of pixel values (gray scale data) of a gray scale image in step 1, the encryption means 4 generates a prime number in the prime number generation process of steps S2 to S5. It should be noted that the process described below is performed for each of the two random numbers p and q.

As shown in step S2, the encryption means 4 sets the most significant bit and the least significant bit to '1'. Thus, the random number generated in step S1 has a length of 256 bits and is an odd number.

Next, in step S3, the encryption means 4 performs division of the random number using all the prime numbers smaller than 256 to determine whether the random number can be divided by all the prime numbers without a remainder. Here, unless the random number can be divided by all the prime numbers without a remainder, the encryption means 4 passes control to step S4, and if the random number can be divided by all the prime numbers without a remainder, the encryption means 4 passes control to step S5.

In step S4, the encryption means 4 uses the Rabin-Miller method which is a representative probability prime number checking method so as to further check whether the random number which has been subjected to division tests by all the prime numbers smaller than 256 in step S3 is a prime number. Here, if the number is determined to be a prime number, control is passed to step S6, and otherwise, control is passed to step S5.

In step 5 which is performed even if the random number is divided by prime numbers without a remainder in step S3, the encryption means 4 subtracts 2 from the value of the random number p (or the random number q). Then, control is passed to step S3, where the encryption means 4 again checks whether the random number subtracted by 2 can be divided by all the prime numbers smaller than 256 without a remained so as to perform the aforementioned processes of step S3 or step S5 and after.

In step S6, as a key generation step, the encryption means 4 fetches a public key N from the aforementioned Equation (1) according to the two prime numbers p and q, and from this public key N and a public key E appropriately selected, obtains a private key D satisfying the aforementioned Equation (2). For example, the encryption means 4 obtains the private key D satisfying the aforementioned Equation (2) by an extended Euclidean algorithm.

As has been described above, in the random number generated by the random number generation step, the most significant bit and the least significant bit are set to '1' in the prime number generation step and the key generation step. Thus, the random number has a 256-bit length and is an odd number. This random number is successively divided by all the prime numbers smaller than 256 and it is confirmed that the random number cannot be divided without a remainder by any of the prime numbers. The random number which has been confirmed that it cannot be divided by any of the prime numbers smaller than 256 is then subjected to a check using the Rabin-Miller method which is a representative probabilistic primality test to determine whether the random number tested is a prime number. Here, if the number is determined not to be a prime number, the random number tested is subtracted by 2 and then again subjected to a check to determine whether the number is a prime number. If the random number is determined to be a prime number, the random number is used to obtain the private key D satisfying the Equation (2) from the public key N calculated from the Equation (1) and the public key E.

As has been described above, the encryption block 2 causes the random number generator 3 to generate a complete random number having a long periodicity and the encryption means 4 to generate a prime number according to this random number, so that the prime number is used to generate the private key D as an encryption key. The fingerprint identification apparatus has private key custody means for keeping the private key D in custody. The private key D thus generated is stored, for example, in the memory 6 functioning as the private key custody means and thus kept in custody within the fingerprint identification apparatus.

The encryption block 2 uses the private key D to encrypt a message (plain text). The message is added by a digital signature as follows in the encryption block 2.

The fingerprint identification apparatus identifies a binary image obtained when a finger is placed on the prism 12 in the fingerprint identification block 8 and identifies the individual. When the individual is identified, the encryption block 2 uses the private key D to encrypt the message. Here, the fingerprint identification apparatus is connected via the interface block 7 to a personal computer (not depicted) and the message has been transmitted via the interface block 7 from the personal computer.

The fingerprint identification apparatus adds a digital signature to the encrypted message in the encryption block 2 and sends the message back to the personal computer.

The personal computer transmits to a desired addressee the encrypted message having the digital signature via a network.

As has been described above, the fingerprint identification apparatus, upon identification of a desired individual, uses an encryption key to encrypt a message and sends the encrypted message to a desired addressee.

As has been described above, this fingerprint identification apparatus uses the least significant bits of a gray scale image obtained in the pick-up block 10 when no finger 100 is placed on the prism 12 and obtains a random number having a long periodicity. According to such a random number, the fingerprint identification apparatus generates a prime number to be used in encryption, thus providing an encryption with a high reliability.

Furthermore, the fingerprint identification apparatus stores the private key D used for encryption, in custody means dedicated for a private key and performed encryption without showing the private key D to an external apparatus such as a personal computer connected. Thus, it is possible to provide an encryption with a high reliability. That is, an encryption is performed entirely within the fingerprint identification apparatus while keeping the private key D in the fingerprint identification apparatus, so that the private key D will not be read by a third party and the sequence of processes for random number generation and encryption can be performed within one and the same fingerprint identification apparatus. Thus, this encryption has an improved security.

It should be noted that in the aforementioned embodiment, an explanation has been given on a case of generating a random number from the least significant bits of pixel values of a gray scale image. However, the fingerprint identification apparatus can also generate a random number according to pixel values of the respective pixels of a binary image, and can generate a random number according to pixel values of respective pixels of a binary image as follows. Here, it is assumed that the horizontal direction address is i and the vertical direction address is j, and an arbitrary pixel on the binary image is b (i, j).

For example, similarly as in the aforementioned gray scale image, when the start address is (128, 0), the random number generator 3 extracts pixel values of respective pixels from pixel b(128, 0) to pixel b(129, 255) and generate two 256-bit random numbers.

Moreover, the random number generator 3 can generate a random number at an arbitrary start address instead of a predetermined position on the screen. For example, the random number generator 3 uses as a start address the horizontal address i and the vertical address j specified by the pixel values of pixels from pixel b(0, 0) to pixel b(0, 7 and pixel values of respective pixels from pixel b(0, 8) to pixel b(0, 14) and extracts pixel values of pixels to generate a random number. For example, when the value specified by the pixel values of pixels from pixel b(0, 0) to pixel b(0, 7) is 100 and the value specified by the pixel values of pixels from pixel b(0, 8) to pixel b(0, 14) is 23, the random number generator 3 extracts pixel values starting at pixel b(100, 23) so as to generate a random number.

Moreover, similarly as in the gray scale image, it is possible to extract pixel values by scanning in the vertical direction, to extract a one-bit data by the exclusive OR operations between two pixels adjacent in the vertical direction, and to perform take-in of an image twice and perform the exclusive OR operation between the two images so as to extract a one-bit data. By such extracts, the random number generator 3 can generate a more complete random number.

According to the two random numbers generated according to the binary image in the random number generator 3, the encryption means 4 generates an encryption key by the prime number generation process and the key generation process shown in FIG. 5. That is, according to the random number based on the pixel values (binary data) of the binary image generated in step S1, an encryption key is generated through the prime number generation process and the key generation process in the steps S2 to S6.

Figure 6:
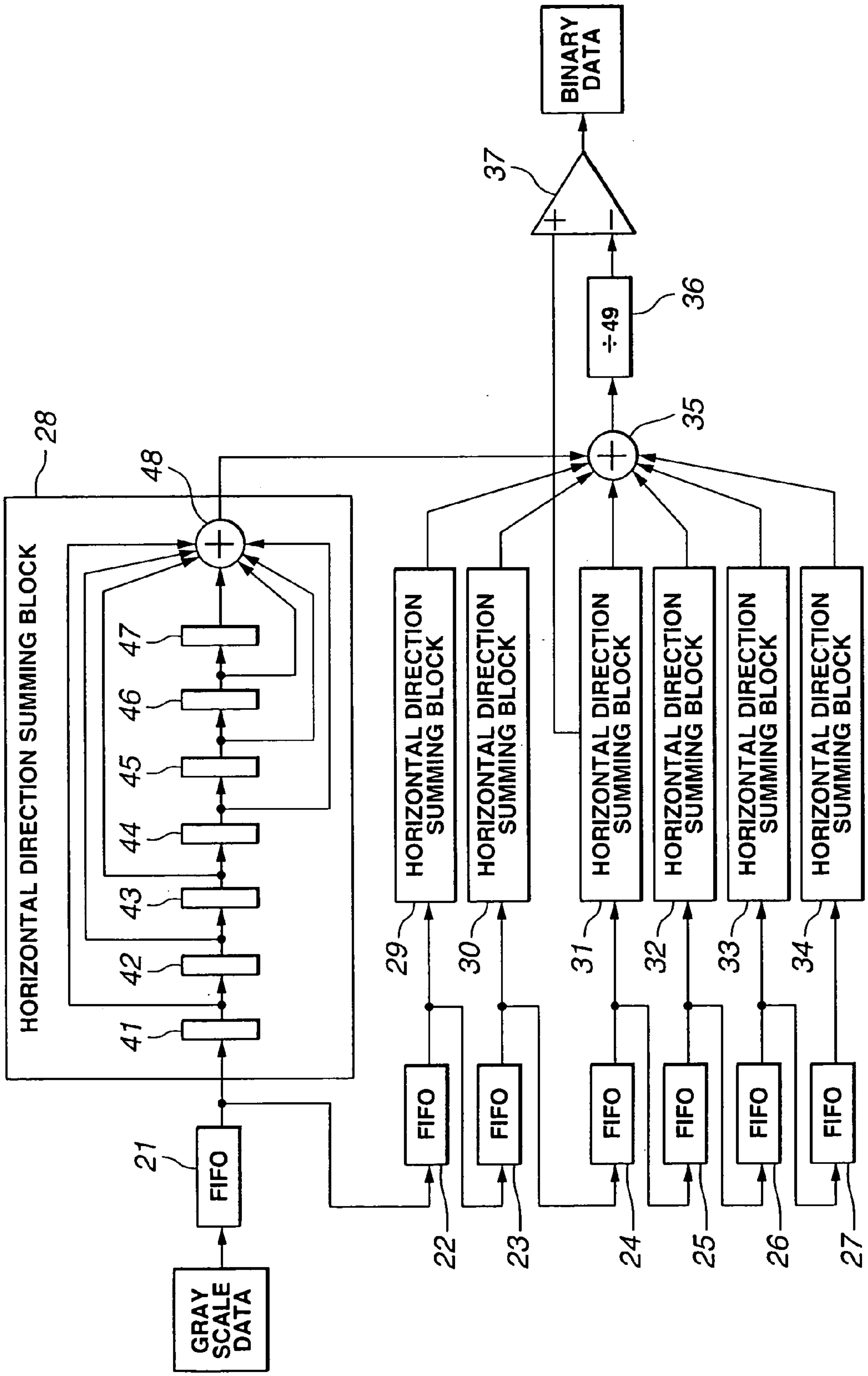
FIG. 6 is a block diagram showing a binary image generator in an image processing block of the aforementioned fingerprint identification apparatus.

It should be noted that as shown in FIG. 6, the image processor 20 includes a binary image generation block for generating a binary image from a gray scale image. This image processor 20 is constructed corresponding to the moving average method. In this embodiment, explanation will be given on binarization performed using an average value of 7 pixels in the vertical direction and 7 pixels in the horizontal direction around a center pixel (7×7 pixels).

The binary image generation block includes: first to seventh FIFO (first-in, first-out) having a 256-byte capacity 21, 22, 23, 24, 25, 26, and 27 connected in series; horizontal direction summing blocks 28, 29, 30, 31, 32, 33, and 34 connected to the latter stage of the first and seventh FIFO 21, 22, 23, 24, 25, 26, and 27, for calculating a total of pixel values of pixels in the horizontal direction; an adder 35 for adding outputs from all the horizontal direction summing blocks 28, 29, 30, 31, 32, 33, and 34; a divider 36 for dividing the output from the adder 35 by 49; and a subtractor 37 for subtracting the output from the divider 36, from the pixel value of the center pixel output from the fourth horizontal direction summing block 31.

Here, in the first to the seventh horizontal direction summing blocks 28, 29, 30, 31, 32, 33, and 34, first to seventh D flip-flops 41, 42, 43, 44, 45, 46, and 47 having an input data of 8-bit width are connected in series so that outputs from the first to the seventh D flip-flops 41, 42, 43, 44, 45, 46, and 47 are added by an adder 48.

In the binary image generation block having the aforementioned configuration, while pixel values of pixels of a gray scale image of N-th scan are output from the first FIFO 21, the second FIFO 22 outputs pixel values of pixels of the gray scale image of N-1-th scan, the third FIFO 23 outputs pixel values of pixels of the gray scale image of N-2-th scan, and thus similarly the fourth to the seventh FIFO 24, 25, 26, and 27 output corresponding pixel values of pixels of the gray scale image.

In the first to the seventh horizontal direction summing blocks 28, 29, 30, 31, 32, 33, and 34, a sum of pixel values of seven continuous pixels in the horizontal direction is calculated. Outputs from the first to the seventh horizontal direction summing blocks 28, 29, 30, 31, 32, 33, and 34 are added in the adder 35 constituting the vertical direction summing block and then input to the divider 36.

The divider 36 divides the total by the number 49 of the pixels added in the horizontal direction and the vertical direction so as to calculate a binary threshold value. The calculated value is compared by the comparator 37 to a binary threshold value of the fourth horizontal direction summing block 31 for binarization.

By the aforementioned configuration, the binary image generation block generates a binary image from the gray scale image.

The random number generator 3 can generates a random number as has been described above according to pixel values of respective pixels of the binary image thus generated by the binary image generation block.

Moreover, the fingerprint identifier 8 identifies a fingerprint according to the binary image generated by the binary image generation block.

The random number generation apparatus according to the present invention includes: digital image conversion means for converting a pick-up signal output from pick-up means, into a digital image; storage means for storing the digital image as pixel values; and random number generation means for extracting a digital data from pixel values of a plurality of pixels in a digital image of a pick-up signal output, when no subject is present, from pick-up means stored in the storage means and generating a random number from the digital data correlated to a plurality of pixels. The pick-up signal output from the pick-up means is converted into a digital image by the digital image conversion means and pixel values of this digital image are stored in the storage means, so that a digital data is extracted from pixel values of a plurality of pixels within the digital image of the pick-up signal output when no subject is present from the pick-up means stored in the storage means. Thus, the random number generation means can generate a random number from the digital data correlated to a plurality of pixels.

This enables the random number generation apparatus to generate a random number having a long periodicity.

Moreover, for example, the fingerprint identification apparatus having a function of encrypting a plain text includes the random number generation apparatus generating such a random number, generates an encryption key within the apparatus, and keeps the encryption key generated, in custody within the apparatus, thus enabling to improve safety in encryption.

Moreover, the random number generation method according to the present invention converts into a digital image a pickup signal output from pick-up means when no subject is present, extracts a digital data from pixel values of a plurality of pixels within the digital image, and generates a random number from the digital data correlated to a plurality of pixels. This enables to generate a random number having a long periodicity.

Moreover, for example, the fingerprint identification apparatus having also a function of encrypting a plain text employs the random number generation method for generating such a random number, so as to generate an encryption key within the apparatus and keep the encryption key generated, in custody within the apparatus. Thus, it is possible to perform encryption with an improved safety.

What is claimed is:

1. A random number generation apparatus comprising:

a pick-up block structurally adapted to capture living body information and to output a pick-up signal depicting said living body information;

A/D converter structurally adapted to convert said pick-up signal into a gray scale image composed of a plurality of gray scale pixels, a gray scale pixel of said plurality gray scale of pixels having a gray scale pixel value expressed by a plurality of bits;

a image processor structurally adapted to generate a binary image from said gray scale image, a binary image pixel of said binary image being generated by comparing said gray scale pixel value with an average of gray scale pixel values for said plurality of gray scale pixels, said binary image pixel having a binary pixel value expressed by a single bit; and an encryption block having a random number generator structurally adapted to generate a random number sequence from said pick-up signal when no living body information is captured by said pick-up block, said random number sequence being generated using either said gray scale pixel value or said binary pixel value, said gray scale pixel being located at a start address, said random number generator generating said random number sequence by extracting the least significant bit of said gray scale pixel value and the least significant bit for each of the gray scale pixel values of a predetermined number of gray scale pixels succeeding said gray scale pixel, said start address being located at an appropriate position in said gray scale image, said appropriate position being at a horizontal address and a vertical address, said horizontal address being a value expressed by said gray scale pixel value, and said vertical address being a value expressed by another gray scale pixel value of another gray scale pixel of said plurality gray scale pixels that is adjacent said gray scale pixel.

2. A random number generating apparatus as claimed in claim 1, wherein said living body information is a fingerprint.

3. A random number generating apparatus as claimed in claim 1, wherein said binary image is composed of a plurality of binary image pixels.

4. A random number generating apparatus as claimed in claim 1, further comprising memory structurally adapted to store said gray scale image.

5. A random number generating apparatus as claimed in claim 1, further comprising memory structurally adapted to store said binary image.

6. A random number generating apparatus as claimed in claim 1, wherein said plurality of gray scale pixels is the number of gray scale pixels for the entire gray scale image.

7. A random number generating apparatus as claimed in claim 1, wherein said plurality of gray scale pixels is the number of gray scale pixels located at a segment of said gray scale image in a predetermined range from said gray scale pixel.

8. A random number generating apparatus as claimed in claim 1, wherein black portions of said binary image represent convex portions of said living body information and the white portions of said binary image represent concave portions of said living body information.

9. A random number generating apparatus as claimed in claim 1, wherein said appropriate position is located at a predetermined position in said gray scale image.

10. A random number generating apparatus as claimed in claim 1, wherein said encryption block further comprises:

encryption means structurally adapted to perform encryption using an encryption key.

11. A random number generating apparatus as claimed in claim 10, wherein said encryption key is said random number sequence.

12. A random number generating apparatus as claimed in claim 10, wherein said encryption means employs the RSA encryption method for generating said encryption key according to two prime numbers and generates said two prime numbers according to said random number generated by said random number generating means, so that said two prime numbers are used for generating said encryption key.

13. A random number generating apparatus as claimed in claim 10, further comprising:

a fingerprint identification block structurally adapted to identify an individual by comparing said binary image with registered image information.

14. A random number generating apparatus as claimed in claim 13, wherein said fingerprint identification block performs an encryption of a plain text using said encryption key when said individual is identified.

15. A random number generating method comprising steps of:

capturing living body information;

outputting a pick-up signal depicting said living body information;

converting said pick-up signal into a gray scale image composed of a plurality of gray scale pixels, a gray scale pixel of said plurality gray scale of pixels having a gray scale pixel value expressed by a plurality of bits;

generating a binary image from said gray scale image, a binary image pixel of said binary image being generated by comparing said gray scale pixel value with an average of gray scale pixel values for said plurality of gray scale pixels, said binary image pixel having a binary pixel value expressed by a single bit; and generating a random number sequence from said pick-up signal when no living body information is captured by said pick-up block, said random number sequence being generated using either said gray scale pixel value or said binary pixel value, said gray scale pixel being located at a start address, said random number sequence being generated by extracting the least significant bit of said gray scale pixel value and the least significant bit for each of the gray scale pixel values of a predetermined number of gray scale pixels succeeding said gray scale pixel, said start address being located at an appropriate position in said gray scale image, said appropriate position being at a horizontal address and a vertical address, said horizontal address being a value expressed by said gray scale pixel value and, said vertical address being a value expressed by another gray scale pixel value of another gray scale pixel of said plurality gray scale pixels that is adjacent said gray scale pixel.

16. A random number generating method as claimed in claim 15, wherein said living body information is a fingerprint.

17. A random number generating method as claimed in claim 15, wherein said binary image is composed of a plurality of binary image pixels.

18. A random number generating method as claimed in claim 15, wherein said plurality of gray scale pixels is the number of gray scale pixels for the entire gray scale image.

19. A random number generating method as claimed in claim 15, wherein said plurality of gray scale pixels is the number of gray scale pixels located at a segment of said gray scale image in a predetermined range from said gray scale pixel.

20. A random number generating method as claimed in claim 15, further comprising the step of:

identifying said binary image.

21. A random number generating method as claimed in claim 15, wherein said appropriate position is located at a predetermined position in said gray scale image.

22. A random number generating method as claimed in claim 15, further comprising the step of:

performing encryption using an encryption key.

23. A random number generating method as claimed in claim 22, wherein said encryption key is said random number sequence.

24. A random number generating method as claimed in claim 22, wherein said encryption key is according to said random number sequence.

25. A random number generating method as claimed in claim 24, wherein said step of performing encryption further comprises:

employing the RSA encryption method to generate said encryption key according to two prime numbers and generates said two prime numbers according to said random number generated by said random number generating means, so that said two prime numbers are used for generating said encryption key.

26. A random number generating method as claimed in claim 22, further comprising the step of:

identifying an individual by comparing said binary image with registered image information.

27. A random number generating method as claimed in claim 26, further comprising:

performing an encryption of a plain text using said encryption key when said individual is identified.

* * * * *